MAGNETIC WIRE ELECTROPOLISHING PROCESS IMPROVEMENT

Filed Jan. 29, 1971

2 Sheets-Sheet 1

INVENTOR.
TOMMY G. LESHER,
BY
Bernard P. Drachlis
ATTORNEY.

MAGNETIC WIRE ELECTROPOLISHING PROCESS IMPROVEMENT

Filed Jan. 29, 1971

United States Patent Office 3,740,324
Patented June 19, 1973

3,740,324
MAGNETIC WIRE ELECTROPOLISHING PROCESS IMPROVEMENT
Tommy G. Lesher, Fullerton, Calif., assignor to Hughes Aircraft Company, Culver City, Calif.
Filed Jan. 29, 1971, Ser. No. 110,918
Int. Cl. C23b 3/06; B01k 3/00
U.S. Cl. 204—129.7 7 Claims

ABSTRACT OF THE DISCLOSURE

A process is disclosed for improving the surface finish quality of relatively small diameter magnetic storage wire produced by drawing relatively large diameter raw stock wire through successive diameter reducing dies. An improvement in the quality of the wire is obtained by electropolishing the wire to reduce the size and density of surface blemishes which occur in the wire in the form of small holes and cracks. Appropriate electrolyte and apparatus for performing the electropolishing process is also disclosed.

BACKGROUND OF THE INVENTION

The use of an elongated magnetic storage medium for a shift register is known in the art. See for example, U.S. Pat. No. 2,919,432, titled Magnetic Device by K. D. Broadbent. It has been found in the past that the use of fine (small diameter) magnetic wire which is subjected to a light longitudinal tension can be used advantageously to fabricate magnetic shift registers. See for example, copending application Ser. No. 785,917, filed Dec. 23, 1968, titled High Density Shift Register Storage Medium by the present applicant and assigned to the assignee of this application.

In order to operate as a shift register, the magnetic medium must be highly magnetically oriented, be magnetized in a reference polarity, and exhibit a difference between the nucleating threshold field $H_S$ (the magnetic field energy required to create a reversed polarity magnetic domain) and the domain wall motion threshold field $H_O$ (the field energy required to make a reversed magnetic domain expand and/or contract once it has been formed). When such a magnetic medium exhibits a differential in its threshold field characteristics, and an external field which is greater than the nucleating threshold field $H_S$ is applied, it tends to switch from a reference magnetic polarity to an opposite polarity through the formation of a small reversed nucleus at some point within the medium. The nucleus then grows by propagational switching to the extremities of the magnetic field which initiated the switching action. This creates a reversed magnetic domain relative to the reference polarity along a segment of the storage medium located between points of the storage medium which are magnetized to the reference magnetic polarity.

The domain wall or transition region existing between two adjacent segments of an oppositely magnetized magnetic medium can be made to shift in one direction or the other by applying a controlled magnetic drive field H parallel to the axis of the magnetic medium over the magnetic domain. The maximum drive field H that can be applied to the magnetic medium is limited by the nucleating threshold field $H_S$ for the driven segment of the magnetic medium. Thus, it is necessary for the magnetic medium to exhibit a differential between the domain wall motion threshold field $H_O$ and the nucleating threshold field $H_S$ where H is greater than $H_O$ and less than $H_S$. In general, the magnitude of the $H_O$ threshold field remains relatively constant. However, the magnitude of the $H_S$ threshold field varies over a wide range from point to point along the length of the magnetic wire.

In order to determine the cause of the variations in the magnitude of the $H_S$ threshold field, the inventor made samplings in the immediate vicinity of an $H_S$ minimum point with a scanning electron microscope that indicated the presence of irregularities in the form of one-to-three micron holes, interconnected with surface cracks. The inventor found that these surface irregularities of the magnetic storage media are the most predominate factor limiting the point to point magnitude of the $H_S$ threshold field. Existing nucleation theories indicate that surface and/or volumetric voids larger than 0.2 micron can grossly reduce the magnetic field required to nucleate a reversed magnetic domain in the magnetic storage wire.

The inventor found that the source of these surface imperfections can be traced to irregularities in the form of imbedded hard scale particles in the surface of the relatively large diameter raw stock wire used in the wire drawing process. These particles tend to scale out as they are drawn through diameter reducing dies. The scaled out particles then act as debris in the lubricant used in the drawing process. This lubricant is made to flow continuously over the input face of the die. Therefore, the scaled out particles are forced through the die and reimbedded from time to time. This process repeats itself at all levels of the drawing process. Since the particles are magnetic, their tendency to cling to the wire and be drawn into the bore of a die is greater than for nonmagnetic materials. However, the cohesive forces of the lubricant tend to cause the particles to cling to the wire in any case.

Most fine wire drawing is done on a multiple die machine. Therefore, the large scale out particles of the first die can be carried in the lubricant to the final die. Imbedded particles which remain tend to elongate and move in the surface of the wire as they are drawn through successive dies. This forms a trough structure immediately adjacent to an imbedded particle. If the direction of the drawing is reversed between setups, a trough may be generated on both sides of an imbedded particle. These troughs will eventually close forming a surface seam or crack. As the remaining particles elongate, they break up and evenutally scale out again. Since this final scale out occurs late in the process, these regions do not close as early as the troughs themselves. Therefore, a level will be found where a series of holes will be present with cracks running between adjacent holes. This situation has been found to exist at the 0.5 mil wire diameter.

SUMMARY OF THE INVENTION

The present invention is process for electropolishing the surface of the relatively large diameter raw stock wire in the early stages of the wire drawing process to remove substantially all imbedded debris. This electropolishing process may be done in line with the wire drawing process. The invention further includes apparatus which may be used to perform the electropolishing process. The disclosed apparatus includes an anode connector to provide electrical contact to the wire being electropolished so that the wire itself may act as the anode in the electrolytic cell. The apparatus further includes a cylindrical cathode through which the wire is drawn while appropriate electrolyte is recirculated within the cylindrical cathode and around the anode wire. The invention further includes an appropriate electrolyte to provide the substantial depth of polish that is required in the relatively short time (one to three mils in less than five seconds), to be compatible with the wire drawing process.

Other objects and features of the invention will become apparent to those skilled in the art as the disclosure is made in the following detailed description of preferred embodiments of the invention.

DESCRIPTION OF THE PREFERRED EMBODIMENTS

Figure 1:
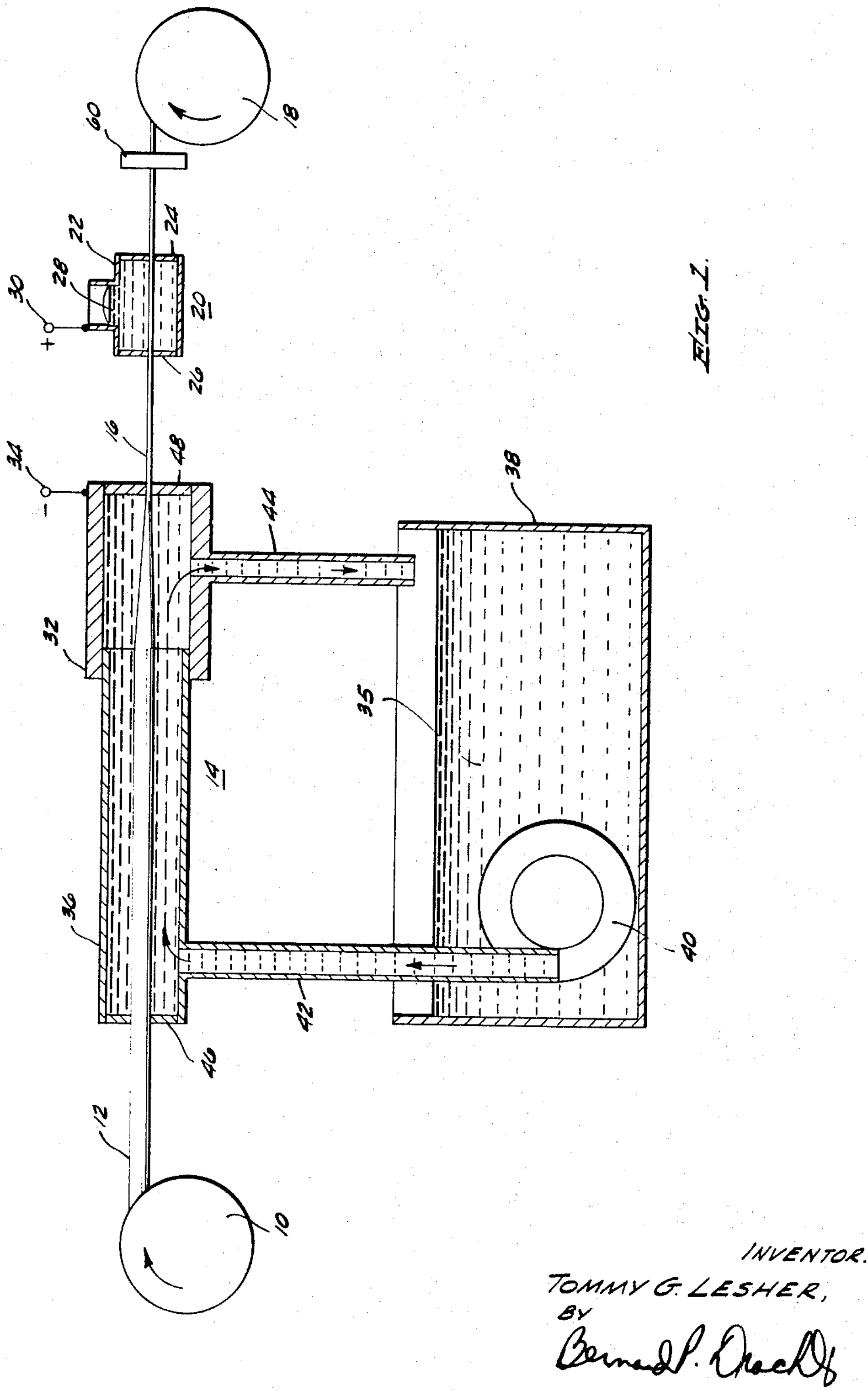
FIG. 1 shows one embodiment of the apparatus of the present invention.

FIG. 1 shows one type of apparatus which may be used to perform the electropolishing process of the present invention. The apparatus includes a supply spool 10 which holds the relatively large diameter raw stock wire 12. The raw stock wire 12 is fed through an electrolytic cell 14 for electropolishing the wire. The polished wire 16 from the electrolytic cell 14 is passed through an anode connector 20 and then is taken up by a takeup spool. 18. The polished wire 16 may then be drawn through diameter reducing dies 60 in the wire drawing process before it is taken up on the takeup spool 18.

The anode connector 20 provides electrical contact to the wire being electro-polished. The anode connector 20 may be formed from a standard ½ inch stainless steel pipe T fitting 22. The T fitting 22 may have Teflon seals 24 and 26 having orifices slightly similar than the polished wire for the polished wire 16 to pass through. The orifices in the Teflon seals 24 and 26 being slightly smaller than the diameter of the polished wire 16 will prevent mercury from seeping out of the anode connector. The anode conector 20 can then be filled with mercury 28 to provide electrical contact from a positive electrical source 30 through the T fitting 22 and the mercury 28 to the wire being electropolished. The wire being electropolished may thus act as the anode of the electrolytic cell.

In accordance with one of the preferred embodiments as shown in FIG. 1, the electrolytic cell 14 includes an electrically conductive cathode 32 to provide electrical connection to a negative electrical source 34. The electrolytic cell 14 further includes means for recirculating electrolyte 35 through the electrolytic cell 14. This is formed from a flow tube 36 which may be made from standard ½ inch plastic tube fittings. One end of the flow tube 36 is connected to one end of the cathode 32. Electrolyte 35 is stored in a storage tank 38 and pumped by an appropriate pump 40 through supply tube 42 to the raw stock end of the flow tube 36. The cathode has a return tube 44 which allows the electrolyte to return to the storage tank 38. The raw stock end of the flow tube 36 has a Teflon seal 46 which has an orifice through which the raw stock wire 12 may pass. The orifice in te Teflon seal 46 is slightly smaller than the diameter of the raw stock wire 12 to prevent electrolyte from seeping out of the flow tube 36. The anode end of the cathode 32 likewise has a Teflon seal 48 which has an orifice through which the polished wire 16 may pass. The orifice in the Teflon seal 48 is slightly smaller than the diameter of the polished wire 16 to prevent electrolyte from seeping out of the flow tube 36. The cathode should be placed at the anode end of the flow tube 36 in order to assure that no electrolyte comes in contact with the polished wire 16 as it leaves the cathode.

Best results are obtained if the electrolyte 35 is recirculated in order to sustain the chemical reactions associated with the electropolishing process. This recirculation also tends to remove the hydrogen gas produced by the electropolishing process and thereby avoid splotching of the wire surface from the bubbling action of the hydrogen gas. It can be seen that the electrolyte 35 is continuously pumped from the storage tank 38 by the pump 40 through supply tube 42, to the flow tube 36 and from there to the cathode 32. The electrolyte is then returned to the storage tank 38 by the return tube 44. The return tube 44 is vented to the atmosphere to allow the accumulated hydrogen gas in the electrolyte solution to escape into the atmosphere.

In designing the electrolytic cell the length of the cathode used must be established to provide optimum polishing conditions of depth and finish without exceeding the curent carrying capability of the electropolished wire. That is, the maximum current usable is limited by the self-heating of the polished wire. Electropolishing is obtained only when the current concentration is kept above a critical level. Therefore, the length of the cathode must be selected to assure the proper concentartion of the full current carrying capability of the wire if a polished surface is to be obtained. In this regard, the maximum current carying capability of the polished wire can be made quite high by keeping the cathode to anode connector distance to a minimum. Use of some form of cooling also increases this level.

It has been found that a cathode length of 3.5 to 4.0 inches provides the best results for a large number of alloy-electrolyte applications. It has also been found that an anode to cathode spacing of 0.5 inch provides the best results when working with 30 mil raw stock wire.

The use of a mercury pool anode connector provides somewhat of a problem. Unfortunately, mercury wets a freshly polished surface extremely well. Also, most alloy metals, especially mangetic alloys, well amalgamate with mercury if allowed to remain in contact over an extended period of time. However, this problem can be eliminated completely by drawing the wire through a die representing at least 20% reduction in area from the polished diameter. This procedure assures that the wire can be electropolished in successive steps whereas a mercury wetted surface cannot be electropolished since the mercury acts to inhibit the electropolishing process.

As an example, this process has been used successfully in the drawing of a 30 mil diameter 70% nickel-iron binary alloy raw stock wire to 0.5 mil diameter. In this work the electrolytic cell described above was used with an electrolyte composed of 10% hydrochloric acid, 10% glycerol and the balance methyl alcohol. All of these chemicals were of reagent grade and great care was used to avoid contamination with water. In this process it was found that two electropolishing steps were required to reduce the scale out problem to a tolerable level. The first polishing step was made with a wire feed rate of approximately one foot per minute and a polishing current of 24.0 ampere. A fan was used to cool the polished wire between the cathode and the anode connector. The first pass reduced the diameter of the wire to 28.5 mil. A 25.3 mil die was used immediately behind the electrolytic cell to wipe the mercury and induce further reduction of the wire. The second polishing step was made with the same wire speed but the current was limited to 16.0 ampere (the maximum allowable without scorching the polished wire). In this second polishing step, a 20.0 mil die was used behind the cell. Standard procedures well known to the art were used in drawing the wire to the fiinal size. This wire was found to be superior in quality to wire drawn from this same raw stock without the preelectropolishing process.

The effectiveness of any electrolyte in providing a uniform surface finish is limited by a severe splotching effect which is caused by contact of hydrogen bubbles generated within the cathode during the electropolishing process.

The cathode is normally formed from a length of tubing of some material such as stainless steel. Best results are obtained with this type of cathode if the electrolyte return outlet is placed through the side of the cathode tube and as near the output end as possible. This forces the flow of the electrolyte to encompass the maximum length of the cathode. However, all of the hydrogen gas formed within the cathode chamber must pass through the entire length of the cathode in order to escape. Therefore, the likelihood of these bubbles coming in contact with the wire being polished is extremely high.

This problem can be grossly reduced if the cathode is designed to induce radial flow of the electrolyte as it passes through the cathode. This can be accomplished if the cathode is formed as a coaxial tube structure. The internal tube can be perforated with holes such that the electrolyte has to flow radially through the perforated holes in passing through the cathode. The hole pattern can be selected for appropriate size and positioning to produce any desired distribution of radial flow. This is shown schematically in FIG. 2. The cathode structure of FIG. 2 has an outer tube 50 and a coaxial internal tube 52. The internal tube 52 has holes 54 radially along its length. The chamber formed between the two tubes acts as a collecting manifold for the hydrogen gas that is isolated from the wire being polished.

The bubble splotching effect can be further reduced with this cathode by providing small venting holes 56 in the output Teflon seal 48 so that the hydrogen gas generated in this region of the cathode may escape directly. Care should be taken to prevent electrolyte loss through these vents from coming in contact with the polished wire 16, or the anode connector 20. This would provide a path for leakage currents in this region and could cause etching of the polished surface.

The uniformity of the surface of the wire can be further improved by constricting the internal diameter of the cathode at the wire outlet through use of a stainless steel washer insert 58 just behind the Teflon orifice 48. This will cause an acceleration of polishing action at this site. This occurs because of the increase in current concentration in this region. Therefore this "wiping" region can reduce the size of any irregularities still remaining on the wire as it reaches this region.

Figure 2:
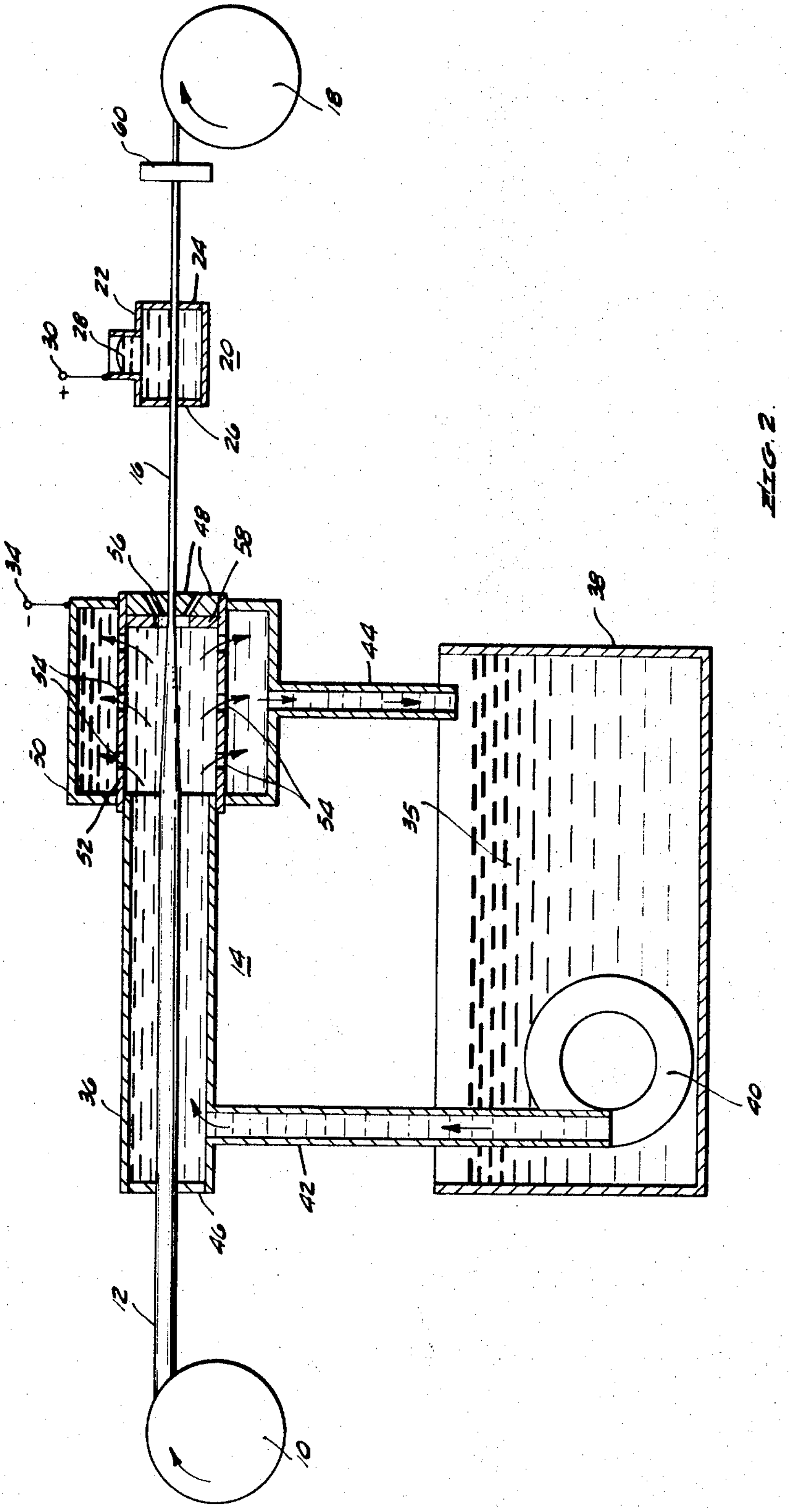
FIG. 2 shows a second embodiment of the apparatus of the present invention.

The remainder of the apparatus shown in FIG. 2 is essentially identical to that of FIG. 1.

ELECTROLYTE

The primary purpose of the electropolishing process is to remove the embedded surface particles from the raw stock wire prior to being drawn. Therefore, polishing depth is more important than the surface finish. However, excessive grain boundary attack would essentially produce the same trough structure as the embedded particles and result in surface seams in the final size wire. Therefore, selection of the electropolishing solution must be made on the basis of providing a balance between depth of polish and surface finish for the specific alloy being electropolished in each application.

It has been found that an electrolyte consisting of 6 to 10 percent hydrochloric acid, 10% glycerol and the balance methyl alcohol provides an extremely effective electrolyte for the raw stock wire electropolishing process. Reagent grade chemicals should be used; water should be avoided. This electrolyte provides 1.5 to 2.0 mils reduction in diameter in 5 seconds when a current density of approximately 1.0 ampere per square centimeter is used. This is equivalent to 24.0 ampere with a 30 mil wire when a 3.75 inch cathode is used in the electrolytic cell. This high current density tends to heat up the electrolyte if a long polishing run is made. It has been found that best results are obtained if the electrolyte is kept below 45° C. Therefore, the electrolyte recirculation system in a production operation should include some form of cooling phase. These techniques are well known to the art.

The described electrolyte has been used successfully with a wire made from a 70% nickel iron binary alloy and a wire made from a 38.5% cobalt, 3% valadium, and the balance iron ternary alloy. Both of these alloys are used as the magnetic storage medium in the fabrication of magnetic wire shift registers. The described electrolyte has also been found to give excellent results with pure nickel, and a silicon aluminum alloy. A noticeable grain boundary attack which adversely affects the desired magnetic properties of the wire occurs when the concentration of hydrochloric acid is increased to 16 percent. When the current density is not kept at the proper level, the surface is quite grainy due to the etching induced when the current concentration is too low. This also adversely affects the desired magnetic properties of the wire.

In light of the above teachings of the preferred embodiments disclosed, various modifications and variations of the present invention are contemplated and will be apparent to those skilled in the art without departing from the spirit and scope of the invention.

What is claimed is:

1. In the method of improving the surface finish of fine magnetic wire prior to a drawing operation, said method comprising the steps of:

drawing the wire through an electrolytic cell having a coaxial cathode;

supplying a negative electrical source to the electrolytic cell;

supplying a positive electrical source to the wire being polished so that the wire acts as the anode in the electrolytic cell; and recirculating electrolyte solution through the electrolytic cell to polish the surface of the wire by electrolysis;

the improvement comprising the steps of:

inducing radial flow of the electrolyte as it passes through the cathode, whereby hydrogen gas generated within the cathode may be isolated from the wire being polished; and increasing the current concentration between the wire and the cathode in the region of the wire outlet of said cell, whereby the polishing action is increased in that region.

2. The improved method of claim 1, further comprising the step of:

venting said electrolytic cell in the region of said wire outlet, whereby hydrogen gas formed in this region may escape directly from the cell.

3. The method of improving the surface finish of fine magnetic wire as claimed in claim 1 wherein:

the electropolishing step removes imbedded debris by reducing the diameter of the wire by about 1.5 mils.

4. A method of improving the surface finish of wire as claimed in claim 1 which further comprises:

maintaining the temperature of the electrolyte solution within a predetermined temperature range.

5. A method of improving the surface finish of fine magnetic wire as claimed in claim 1 wherein the wire is drawn through the electrolytic cell and the anode connector at a rate of approximately one foot per minute.

6. A method of improving the surface finish of fine magnetic wire as claimed in claim 1 wherein the positive and negative electrical sources provide a current of about 24 amperes.

7. An anhydrous electrolyte for electropolishing fine magnetic wire, said electrolyte consisting essentially of 6–10% hydrochloric acid, 10% glycerol, and the balance methyl alcohol.

References Cited

UNITED STATES PATENTS

| | | | |
|---|---|---|---|
| 2,370,973 | 3/1945 | Lang | 204—209 |
| 2,953,507 | 9/1960 | Palme | 204—140.5 |
| 3,556,957 | 1/1971 | Toledo | 204—28 |
| 3,630,864 | 12/1971 | Nakamura et al. | 204—140.5 |
| 2,382,549 | 8/1945 | Edmonson | 204—140.5 |
| 2,315,695 | 4/1943 | Faust | 204—140 |

OTHER REFERENCES

Preparation of Very Fine Wire by Electropolishing by Wm. Colner et al., Metal Progress, June 1951, pp. 795–797.

JOHN H. MACK, Primary Examiner

T. TUFARIELLO, Assistant Examiner

U.S. Cl. X.R.

204—129.1, 129.85, 209